United States Patent [19]

Ueno et al.

[11] Patent Number: 4,464,404

[45] Date of Patent: Aug. 7, 1984

[54] PROCESSES FOR PRODUCTION OF REFRIGERATED MINCED FISH FLESH AND FISH PASTE PRODUCT HAVING IMPROVED QUALITY

[75] Inventors: Ryuzo Ueno, Nishinimiya; Tatsuo Kanayama; Kunihiko Tomiyasu, both of Takarazuka; Asao Fujikami; Toshitaka Nakashima, both of Nishinomiya, all of Japan

[73] Assignee: Ueno Fine Chemicals Industry, Ltd., Osaka, Japan

[21] Appl. No.: 426,093

[22] Filed: Sep. 28, 1982

[30] Foreign Application Priority Data

Oct. 1, 1981 [JP] Japan .............................. 56-154832
Dec. 3, 1981 [JP] Japan .............................. 56-193688

[51] Int. Cl.$^3$ ............................................. A22C 25/00

[52] U.S. Cl. .................................. 426/332; 426/574; 426/643; 426/657

[58] Field of Search ............... 426/573, 574, 643, 332, 426/657

[56] References Cited

U.S. PATENT DOCUMENTS 4,062,409 12/1977 Niki et al. ........................... 426/643
4,215,153 7/1980 Kai et al. ............................. 426/643
4,342,790 8/1982 Katoh et al. .................... 426/643 X

*Primary Examiner*—Robert A. Yoncoskie
*Attorney, Agent, or Firm*—Sherman & Shalloway

[57] ABSTRACT

A process for producing a refrigerated minced flesh of fish, which comprises adding (a) a sugar and/or a sugar alcohol and (b) lactalbumin and/or blood plasma to a dehydrated fish flesh, mincing the mixture and then refrigerating the minced product.

9 Claims, 2 Drawing Figures

PROCESSES FOR PRODUCTION OF REFRIGERATED MINCED FISH FLESH AND FISH PASTE PRODUCT HAVING IMPROVED QUALITY

This invention relates to processes for the production of a refrigerated minced flesh of fish and a paste product of fish which have improved quality.

Generally, the refrigerated minced flesh of fish is prepared from a variety of fish such as Alaska pollack, Atka mackerel, Croaker, cutlass fish, sharp-toothed sea eel, sardine, mackerel and saury pike. Such a fish material is washed, beheaded and eviscerated, chopped, dipped and rinsed several times in water to remove water-soluble proteins, blood, entrails and other foreign matter, and then dehydrated to form a dehydrated fish flesh. To prevent denaturation of protein during refrigeration, a sugar, a polyphosphate, an edible surface-active agent, salt, etc. are added to the dehydrated flesh. The mixture is minced, and then frozen at a low temperature of less than $-30°$ C. to produce a refrigerated minced flesh of fish. Refrigerated minced fleshes are of two kinds, a salt-free minced flesh produced by adding a sugar and a polyphosphate to the dehydrated flesh and a salted minced flesh produced by adding a sugar and salt to the dehydrated flesh. The former is now produced in greater quantities, and a surface-active agent for foods is used in both of these products. As the period of freezing becomes longer, it is difficult to keep the quality of the refrigerated minced flesh, and particularly to maintain the gel-forming ability of the refrigerated minced flesh in the making of "kamaboko", a kind of fish paste product, at substantially the same level as that of a non-refrigerated minced flesh. This problem is presently solvent by increasing the amount of the sugar or polyphosphate added, or performing refrigeration exactly at less than $-30°$ C.

The amount of the sugar added is usually 3 to 10%, and the larger the amount of the sugar, the greater is the effect of preventing denaturation of protein during refrigeration. Too large an amount, however, results in an excessively sweet paste product, or in a reduced proportion of protein in the refrigerated minced flesh. Hence, amounts of more than 10% are seldom used. The polyphosphate has a water-holding effect as well as an effect of preventing denaturation of protein. If, however, a fish paste product is prepared from a refrigerated minced flesh containing 0.3 to 0.4% or more of the polyphosphate, the decrease of the viscosity, known as "sagging" in the trade, of the minced flesh occurs, and it is difficult to maintain it in a definite shape. The addition of a large amount of the polyphosphate should therefore be avoided. Furthermore, if the storage conditions are not strictly observed in the course of shipment and distribution, paste products from such a minced flesh frequently have reduced elasticity, or drips frequently occur when the refrigerated minced flesh is defrosted.

The present inventors have undertaken assiduous investigations about the improvement of the quality of the refrigerated minced flesh of fish, and consequently found that by adding a sugar and/or a sugar alcohol and an animal protein to a dehydrated fish flesh, mincing the mixture and then refrigerating the minced product, there can be obtained a refrigerated minced flesh of fish having high quality which has much better elasticity (gel-forming ability) than conventional refrigerated fleshes of fish and have a reduced tendency to undergo protein denaturation during refrigerated storage and to drip upon defrosting.

Thus, according to this invention, there is provided a process for producing a refrigerated minced flesh of fish, which comprises adding (a) a sugar and/or a sugar alcohol and (b) lactalbumin and/or blood plasma to a dehydrated fish flesh, mincing the mixture and then refrigerating the minced product. If desired, ovalbumin may also be added besides the aforesaid additives. If further required, a polyphosphate and/or an edible surface-active agent may also be added. This gives a refrigerated minced flesh having much better protein denaturation preventing action during refrigerated storage.

Elasticity is an important factor for the quality of a fish paste product, and to obtain a fish paste product having good elasticity, it is most desirable to use a minced flesh of high quality obtained from fresh fish. In recent years, it has become increasingly difficult to secure fresh fish (Alaska pollack, etc.) as a material for minced fleshes of good quality because of the restriction of fisheries by the establishment of 200 sea-mile territorial waters and the decrease of fish resources. Thus, in order to utilize Alaska pollack and other coastal fish effectively as a material for minced fleshes, efforts have been made to use fish of reduced freshness or to increase the yield of minced flesh production. But these efforts have resulted in a reduction in the quality of the minced fleshes. If these low-quality minced fleshes are used to produce fish paste products such as kamaboko and "chikuwa", the resulting products will have reduced elasticity.

Recently, techniques for the production of refrigerated minced fleshes from red-fleshed fish such as sardine and mackerel have advanced, and such fleshes have come into use as a food material. Since, however, these fish rapidly decrease in freshness and the denaturation of proteins occurs rapidly, the elasticity of fish paste products made from these materials is likely to be reduced. Furthermore, since these red-fleshed fish as minced flesh are susceptible to deterioration occurring during preparation of kamaboko, fish paste products made therefrom will have reduced elasticity.

It is strongly desired therefore to increase the elasticity of a fish paste product produced from such a minced flesh and to inhibit its deterioration.

The present inventors have undertaken assiduous investigations in order to achieve this desire, and consequently found that when blood plasma is added to a meat paste composed of a minced flesh of fish, the setting of the minced flesh is promoted, with the result that a fish paste product made therefrom has increased elasticity, and moreover, its deterioration can be inhibited.

Thus, according to another aspect of this invention, there is provided a process for improving the quality of a fish paste product, which comprises adding blood plasma to a meat paste in the production of a fish paste product.

Illustrative of the sugar added to the dehydrated fish flesh in accordance with the process of this invention are sucrose, maltose, glucose, fructose and xylose. Examples of the sugar alcohol are sorbitol, maltitol and xylitol. These are used either singly or in combination in the form of a powder or liquid. The amount of the sugar and/or sugar alcohol is about 2 to about 15%, preferably about 3 to about 10%, based on the dehydrated fish (all percentages appearing in this specification are by weight unless otherwise specified).

The amounts of lactalbumin, blood plasma (composed mainly of albumin and globulin) and ovalbumin, which are animal proteins, to be added to dehydrated fish flesh are as follows (dry weight): Lactalbumin is used in an amount of 0.1 to 7%. Because amounts of more than 5% sometimes affect the flavor of the final product, the preferred amount of lactalbumin is about 0.2 to about 5%. The amount of blood plasma (preferably plasma obtained from bovine, swine, chicken, etc.) is 0.1 to 3% by weight, preferably about 0.2 to about 2%. The amount of ovalbumin is not more than 2.5%. Larger amounts are undesirable because they sometimes leave a smell of egg white in the final product. Usually, it is used in an amount of about 0.2 to about 2%. These proteins may be used in the form of a liquid or a dry powder, or an aqueous emulsion, suspension or solution.

For the ease of operation in the production of a refrigerated minced flesh of fish, it is preferred to add a dry powder of such a protein component as a pre-mixture with the sugar and/or sugar alcohol to the dehydrated fish flesh. They may, however, be added separately.

These proteins may be used in combination. For example, the use of a combination of 0.75% of lactalbumin and 0.25% of ovalbumin, or a combination of 0.5% of lactalbumin, 0.25% of blood plasma and 0.25% of ovalbumin gives a refrigerated minced flesh having still better gel-forming ability.

By using the animal protein in combination with 0.1 to 0.3% of a polyphosphate, it is possible to further improve the water-holding effect durable under refrigerated conditions and the effect of increasing the elasticity of kamaboko.

Examples of the edible surface-active agents include glycerin fatty acid esters, propylene glycol fatty acid esters, sorbitan fatty acid esters, sucrose fatty acid esters, soybean phospholipids, polyglycerin fatty acid esters, polyoxyethylene sorbitan fatty acid esters, and propylene glycol alginate. Use of 0.05 to 0.5% of the edible surface-active agent imparts better gel-forming ability, improved whiteness, and durability to long-term refrigerated storage.

The polyphosphate and the edible surface-active agent are added in a powder or liquid form to the sugar or sugar alcohol, or to the animal protein, either as a pre-mixture or separately.

In a preferred embodiment of the present invention, small pieces of flesh cut from fish are dipped in water in a customary manner and then dehydrated to produce a dehydrated fish flesh for mincing. The aforesaid additives are then mixed with the dehydrated flesh by using a mincer. The minced product is refrigerated preferably at a temperature of less than −30° C.

According to the process of this invention, the quality of the refrigerated minced flesh of fish can be markedly improved over the conventional processes as can be seen from the results of tests given hereinafter.

Furthermore, according to the process of this invention, the setting of a refrigerated minced flesh or a non-refrigerated minced flesh is promoted by adding blood plasma to a meat paste obtained by grinding the flesh together with 2 to 3% of salt, and then allowing the mixture to stand. By heating a hard resilient and tough jelly-like mass (konnyaku-like gel) formed by dint of this setting, extraordinarily strong elasticity is obtained, and the quality of fish pastes products is markedly improved. Since the setting of a meat paste is generally faster as the temperature at which it is left to stand is higher, the standing time can be shortened. When the meat paste is left to stand for a long period of time at a temperature of about 60° C., its gell structure is destroyed by alkaline proteases or by heat denaturation. As a result, an abrupt reduction in elasticity occurs and a deteriorating phenomenon sets in. If blood plasma is added to the meat paste in accordance with this invention, this deterioration is inhibited, and fish paste products having good elasticity can be obtained from the meat paste. By the addition of blood plasma, an improvement in the elasticity of non-set fish paste products is also observed.

The excellent effects of the plasma in this invention to promote setting and inhibit deterioration can be shown by examining the gellation characteristics of a minced fish flesh on the basis of graphs showing the gel strengths of minced flesh gels obtained by heating minced flesh at 30° to 90° C. for 20 minutes or 120 minutes (see Examples 5 and 6 and FIGS. 1 and 2); or by examining to what extent a gel structure formed by heating at 50° C. for 20 minutes will be destroyed by heating it at 60° C. for 2 hours (the measure of susceptibility to deterioration) (see Example 4).

It has been the previous practice to add starch, gluten, etc. to fish paste products such as kamaboko in order to strengthen their elasticity, but the elasticity of the products thus obtained is different in quality from the inherent elasticity of the fish paste products themselves and is therefore undesirable. In contrast, the plasma protein used in this invention is an animal protein unlike vegetable proteins such as gluten or starch, and is excellent in that it imparts elasticity very similar to the elasticity obtained by the elasticity-forming ability of the minced flesh itself.

The plasma to be added to the meat paste is composed mainly of albumin and globulin as is the case with the plasma to be added to the dehydrated fish flesh. It is preferably obtained from bovine, swing, chicken, etc. The amount of the plasma to be added varies with the kind of fish, the quality and freshness of the meat paste, but is usually 0.1 to 3%, preferably 0.2 to 2%, as dry weight, based on the weight of the product. Larger amounts of plasma may be added, but sometimes leave a peculiar smell of protein. The plasma may be added in the form of a liquid or dry powder, or an aqueous emulsion, suspension or solution. If desired, the plasma may be used in combination with another protein such as ovalbumin, casein, lactablbumin, and gluten.

Fish paste products can be produced in a customary manner except that the plasma is added to the meat paste. Refrigerated minced fleshes or non-refrigerated raw fleshes from various kinds of fish are used to produce the meat paste. Ordinary additives for the production of fish paste products, such as salt, sugars, sugar alcohols, seasonings, and spices, may be added to the meat paste. When plasma as a dry powder is used, it is desirably pre-mixed with a sugar and/or a sugar alcohol, because the addition of such a pre-mixture to the meat paste creates a homogeneous dispersed condition within a short period of time. Of course, these additives may be added separately.

The following non-limitative Examples illustrate the present invention more specifically. All percentages in these examples are by weight.

BRIEF DESCRIPTION OF THE DRAWINGS

In the accompanying drawings.

Figure 1:
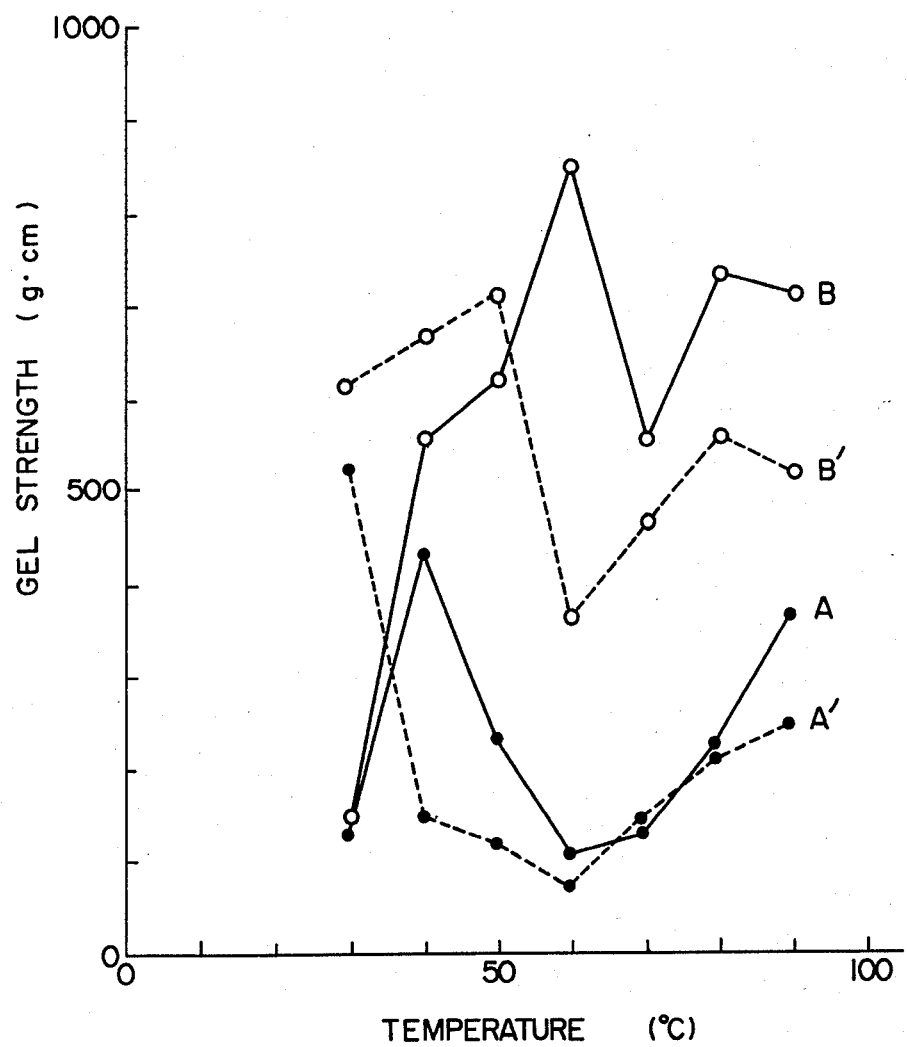
FIG. 1 is a graph showing the relation of the gel strength, the heating temperature and the heating time with respect to a refrigerated minced flesh of sardine (Example 5)

In these drawings, curve A shows a control test lot where heating was carried out for 20 minutes; curve B, a test lot in accordance with this invention in which heating was carried out for 20 minutes; curve A', a control test lot in which heating was carried out for 120 minutes; and curve B', a test lot in accordance with this invention in which heating was carried out for 120 minutes.

EXAMPLE 1

A dehydrated flesh having a uniform water content was produced in a customary manner from Alaska pollack caught on the day before the day of testing. The additives shown in Table 1 were added to 10 kg of the flesh in each lot, and they were mixed for 10 minutes by a grinder to form a uniform mixture. The mixture was filled into two plastic bags each in an amount of 5 kg, and refrigerated overnight at −38° C. to form a refrigerated minced flesh. Thereafter, the refrigerated minced flesh was stored at −30° C.

Three days and three months respectively after the refrigeration, the refrigerated minced flesh in each lot (5 kg) was taken out, and spontaneously defrosted by leaving it to stand indoors overnight. The minced flesh (4 kg) was put in a small-sized silent cutter, and 3% of salt and 5% of starch were added. They were kneaded for 13 minutes, and the mixture was filled in cylindrical casings of polyvinylidene chloride film and steamed at 90° C. for 30 minutes.

The resulting non-set kamaboko was stored overnight, and its elasticity and flavor were examined. The elasticity was determined by measuring the load (W g) at breakage and the size (L cm) of a depression at room temperature with a food rheometer with a spherical plunger having a diameter of 5 mm (made by Fudo Kogyo Co., Ltd.), and calculating the product of W and L (W·L g-cm). The flavor was examined organoleptically by a panel of 10 specialists.

Even after the lapse of three months from the refrigeration, the products in the test lots of this invention retained the same strong gel-forming ability as that immediately after the refrigeration. When lactalbumin and plasma are added in large amounts, a peculiar smell of protein may sometimes remain.

TABLE 1

| Test lot | | Sucrose (%) | Polyphosphate (%) | Lactalbumin (%) | Plasma (%) |
|---|---|---|---|---|---|
| 1 | (prior art) | 5 | 0.2 | | |
| 2 | (invention) | 5 | | 0.1 | |
| 3 | " | 5 | | 0.2 | |
| 4 | " | 5 | | 1.0 | |
| 5 | " | 5 | | 3.0 | |
| 6 | " | 5 | | 5.0 | |
| 7 | " | 5 | | 7.0 | |
| 8 | " | 5 | | | 0.1 |
| 9 | " | 5 | | | 0.2 |
| 10 | " | 5 | | | 1.0 |
| 11 | " | 5 | | | 2.0 |
| 12 | " | 5 | | | 3.0 |

Note:
The plasma used was separated from the blood of bovine or swine, followed by drying.

TABLE 2

| | | Elasticity of kamaboko | | | | | | Effect of preventing denaturation during refrigerated storage (B/A × 100) | Flavor of kamaboko |
|---|---|---|---|---|---|---|---|---|---|
| | | Three days after refrigeration | | | Three months after refrigeration | | | | |
| Test lot | | W (g) | L (cm) | WL(A) (g·cm) | W (g) | L (cm) | WL(B) (g·cm) | | |
| 1 | (prior art) | 350 | 0.91 | 319(100) | 310 | 0.84 | 260(100) | 81.5 | Normal |
| 2 | (invention) | 365 | 0.93 | 339(106.3) | 360 | 0.93 | 335(128.8) | 98.8 | " |
| 3 | " | 370 | 0.95 | 352(110.3) | 370 | 0.94 | 348(133.8) | 98.9 | " |
| 4 | " | 390 | 0.96 | 374(117.2) | 390 | 0.95 | 371(142.7) | 99.2 | " |
| 5 | " | 450 | 1.01 | 455(142.6) | 460 | 1.01 | 465(178.8) | 102.2 | " |
| 6 | " | 530 | 1.06 | 562(176.2) | 525 | 1.05 | 551(211.9) | 98.0 | Slight milk-like smell |
| 7 | " | 550 | 1.02 | 561(175.9) | 560 | 1.00 | 560(215.4) | 99.8 | Strong milk-like smell |
| 8 | " | 370 | 0.92 | 340(106.6) | 365 | 0.92 | 336(129.2) | 98.8 | Normal |
| 9 | " | 385 | 0.94 | 362(113.5) | 380 | 0.94 | 357(137.3) | 98.6 | " |
| 10 | " | 420 | 0.96 | 403(126.3) | 410 | 0.96 | 394(151.5) | 97.8 | " |
| 11 | " | 480 | 1.00 | 480(150.5) | 475 | 0.98 | 466(179.2) | 97.1 | Slight undesirable odor |
| 12 | " | 530 | 1.01 | 535(167.7) | 535 | 1.00 | 535(205.8) | 100 | Undesirable odor |

Note:
The parenthesized figures are relative values calculated when the value in the prior art lot is taken as 100.

EXAMPLE 2

Refrigerated minced fleshes having the compositions shown in Table 3 were produced in the same way as in Example 1. In order to examine the gel-forming ability of these fleshes, non-set kamabokos were produced from the minced fleshes in the same way as in Example 1. Furthermore, set kamabokos were produced by adding salt to the fleshes, allowing them to stand for 3 hours at 30° C., and then steaming them at 90° C. for 30 minutes.

In order to simulate the storage conditions in the course of shipment and distribution of refrigerated minced fleshes, the above refrigerated minced fleshes were stored at −30° C. for the first one and a half months, at −15° C. for the next 0.5 month, and then at −30° C. for one month. Dripping of the refrigerated minced fleshes upon defrosting after the 3-months refrigerated storage was examined. The results are shown in Table 4.

It is seen from Table 4 that by adding lactalbumin and/or plasma, and sugar, dripping at the time of defrosting can be inhibited and the elasticity of kamaboko can be markedly increased. Furthermore, as seen from test lots 8, 9 and 10, the addition of a polyphosphate and/or a glycerin fatty acid ester together with the sugar, lactalbumin, plasma and ovalbumin produced an effect of preventing denaturation during refrigerated storage. Furthermore, in test lots 9 and 10 in which the glycerin fatty ester was used together, the colors of the refrigerated minced fleshes and the kamabokos prepared therefrom were improved, and became white.

ameter of 30.6 mm, and heated for 30 minutes in hot water at 90° C. to produce non-set kamabokos. Furthermore, the filled mixture was allowed to stand for 3 hours in a constant temperature chamber at 30° C., and then heated for 30 minutes in hot water at 90° C. to produce set kamabokos. The resulting kamabokos were stored at room temperature overnight, and their elasticity and flavors were examined.

The results are shown in Table 5. It is seen that the addition of plasma in accordance with this invention

TABLE 3

| Test lot | | Sucrose (%) | Sorbitol (%) | Polyphosphate (%) | Glycerin fatty acid ester (%) | Lact-albumin (%) | Plasma (%) | Ovalbumin (%) |
|---|---|---|---|---|---|---|---|---|
| 1 | (prior art) | 4 | 4 | 0.3 | | | | |
| 2 | (invention) | 4 | 4 | | | 0.5 | | |
| 3 | " | 4 | 4 | | | | 0.5 | |
| 4 | " | 4 | 4 | | | 0.25 | 0.25 | |
| 5 | " | 4 | 4 | | | 0.4 | | 0.1 |
| 6 | " | 4 | 4 | | | | 0.5 | 0.25 |
| 7 | " | 4 | 4 | | | 0.25 | 0.25 | 0.25 |
| 8 | " | 4 | 4 | 0.3 | | 0.25 | 0.25 | 0.25 |
| 9 | " | 4 | 4 | 0.3 | 0.3 | 0.25 | 0.25 | 0.25 |
| 10 | " | 4 | 4 | 0.3 | 0.3 | 0.5 | | 0.25 |

Note:
The plasma used was the same as in Example 1.

TABLE 4

| | | Elasticity of kamaboko | | | | | | | |
|---|---|---|---|---|---|---|---|---|---|
| | | Three day after refrigeration | | | Three months after refrigeration | | | Effect of preventing denaturation during | Dripping at |
| Test lot | | W (g) | L (cm) | WL(A) (g · cm) | W (g) | L (cm) | WL(B) (g · cm) | refrigerated storage (B/A × 100) | the time of defrosting |
| Non-set kamaboko | | | | | | | | | |
| 1 | (prior art) | 330 | 0.95 | 314(100) | 300 | 0.90 | 270(100) | 86.0 | Yes |
| 2 | (invention) | 400 | 1.02 | 408(129.9) | 390 | 1.01 | 394(145.9) | 96.6 | No |
| 3 | " | 420 | 1.02 | 428(136.3) | 415 | 1.01 | 419(155.2) | 97.9 | " |
| 4 | " | 410 | 1.02 | 418(133.1) | 410 | 1.00 | 410(151.9) | 98.1 | " |
| 5 | " | 420 | 1.02 | 428(136.3) | 415 | 1.00 | 415(153.7) | 97.0 | " |
| 6 | " | 460 | 1.07 | 492(156.7) | 450 | 1.06 | 477(176.7) | 97.0 | " |
| 7 | " | 455 | 1.05 | 478(152.2) | 455 | 1.04 | 473(175.2) | 99.0 | " |
| 8 | " | 470 | 1.07 | 503(160.2) | 470 | 1.08 | 508(188.1) | 101.0 | " |
| 9 | " | 480 | 1.09 | 523(166.6) | 475 | 1.08 | 513(190.0) | 98.1 | " |
| 10 | " | 480 | 1.10 | 528(168.2) | 475 | 1.10 | 523(193.7) | 99.1 | " |
| Set kamaboko | | | | | | | | | |
| 1 | (prior art) | 350 | 0.97 | 340(100) | 305 | 0.92 | 281(100) | 82.6 | |
| 2 | (invention) | 470 | 1.05 | 494(145.3) | 460 | 1.05 | 483(171.9) | 97.8 | |
| 3 | " | 480 | 1.05 | 504(148.2) | 480 | 1.04 | 499(177.6) | 99.0 | |
| 4 | " | 475 | 1.04 | 494(145.3) | 470 | 1.03 | 484(172.2) | 98.0 | |
| 5 | " | 470 | 1.04 | 489(143.8) | 460 | 1.03 | 474(168.7) | 96.9 | |
| 6 | " | 530 | 1.08 | 572(168.2) | 520 | 1.07 | 556(197.9) | 97.2 | |
| 7 | " | 515 | 1.07 | 551(162.1) | 510 | 1.05 | 536(190.7) | 97.2 | |
| 8 | " | 560 | 1.10 | 616(181.2) | 560 | 1.10 | 616(219.2) | 100.0 | |
| 9 | " | 600 | 1.13 | 678(199.4) | 605 | 1.13 | 684(243.4) | 100.9 | |
| 10 | " | 590 | 1.15 | 679(199.7) | 580 | 1.16 | 673(239.5) | 99.1 | |

Note:
The parenthesized figures are relative values calculated when the value in the prior art lot is taken as 100.

EXAMPLE 3

A refrigerated minced flesh produced from Alaska Pollack having reduced freshness was defrosted. Six kilograms of the minced flesh was put in a small-sized silent cutter, and together with 3% of salt and 5% of starch, kneaded for 13 minutes. The same operation as above was carried out two more times. From the resulting three minced fresh samples, one kilogram-portions were taken out respectively. A pre-mixture of 1% of sorbitol and plasma in each of the concentrations shown in Table 5 was added to 3 kg in total of the minced flesh samples, and they were mixed for 5 minutes in a small-sized grinder. The mixture was filled in cylindrical casings of polyvinylidene chloride film each having a digave excellent elasticity to both the non-set and set kamabokos, and the increase in the elasticity of the set kamabokos was especially great.

TABLE 5

| Amount of the plasma added (*) (%) | Elasticity of kamaboko | | | Flavor of kamaboko |
|---|---|---|---|---|
| | W (g) | L (cm) | W · L (g cm) | |
| Non-set lots | | | | |
| Not added | 307 | 0.85 | 261 | Normal |
| 0.25 | 380 | 0.98 | 372 | " |
| 0.5 | 402 | 0.99 | 398 | " |
| 1 | 450 | 1.01 | 455 | " |
| 2 | 554 | 1.05 | 582 | Slight undesirable |

TABLE 5-continued

| Amount of the plasma added (*) (%) | Elasticity of kamaboko W (g) | L (cm) | W·L (g cm) | Flavor of kamaboko odor |
|---|---|---|---|---|
| 3 | 610 | 1.04 | 634 | Some undesirable odor |
| 4 | 659 | 1.01 | 666 | Undesirable odor |
| Set lots | | | | |
| Not added | 347 | 0.88 | 305 | Normal |
| 0.25 | 429 | 1.02 | 438 | " |
| 0.5 | 501 | 1.09 | 546 | " |
| 1 | 556 | 1.13 | 628 | " |
| 2 | 610 | 1.12 | 683 | Slight undesirable odor |
| 3 | 650 | 1.10 | 715 | Some undesirable odor |
| 4 | 698 | 1.06 | 740 | Undesirable odor |

(*) The amount is based on the weight of the minced flesh.

EXAMPLE 4

The same refrigerated minced flesh of Alaska pollack as in Example 3 was defrosted. Four kilograms of the minced flesh was then put in a small-sized silent cutter, and together with 3% of salt and 5% of starch, kneaded for 13 minutes. The mixture was divided into 2 kg portions. To one of them, 1% of sorbitol was added, and a pre-mixture of 1% of sorbitol and 0.5% of plasma was added to the other. Each of these portions was mixed for 5 minutes in a small-sized grinder, and then filled in cylindrical casings of polyvinylidene chloride film each having a diameter of 30.6 mm, heated for 20 minutes in hot water at 50° C. to set it, and further heated for 120 minutes in hot water at 60° C. to deteriorate it. The konnyaku-like gel obtained by setting and deterioration and the deteriorated gel were rapidly cooled in ice water for 30 minutes and then immediately, their elasticities were examined.

The elasticity was measured by using a food heometer having a spherical plunger with a diameter of 8 mm. The results are shown in Table 6. It is seen that setting is promoted, and the deterioration is inhibited, in the lots in accordance with this invention in contrast to the control lot.

TABLE 6

| Test lot | (A) Heated at 50° C. for 20 minutes Elasticity of the gel | | | | (B) Heated at 50° C. for 20 minutes and then at 60° C. for 120 minutes Elasticity of the gel | | | | Deterioration ratio = $\frac{A - B}{A} \times 100$ (%) | | |
|---|---|---|---|---|---|---|---|---|---|---|---|
| | W (g) | L (cm) | W·L (g·cm) | Condition of the gel | W (g) | L (cm) | W·L (g·cm) | Condition of the gel | W (g) | L (cm) | W·L (g·cm) |
| Control | 262 | 1.86 | 487 | Konnyaku-like | 95 | 0.65 | 62 | Deteriorated | 63.7 | 65.1 | 87.3 |
| Invention | 321 | 1.89 | 607 | Konnyaku-like | 250 | 0.98 | 245 | Somewhat deteriorated but a kamaboko-like gel still remained | 22.1 | 48.1 | 59.6 |

EXAMPLE 5

Refrigerated minced flesh of sardine (containing 5% of sugar and 0.2% of polyphosphate) was defrosted, and 6 kg of the minced flesh was put in a small-sized silent cutter. Then, 3% of salt and 3% of starch were added and they were kneaded for 13 minutes. The mixture was divided into two 3 kg-portions. Powdery sorbitol (1%) was added to one portion, and a pre-mixture of 1% of sorbitol and 0.5% of plasma was added to the other. The two portions were each mixed in a small-sized grinder, and then filled in cylindrical casings of polyvinylidene chloride film each having a diameter of 30.6 mm, and heated for 20 minutes or 2 hours at the various temperatures shown in Table 7 to form gels.

The various gels so formed were rapidly cooled in ice water for 30 minutes, and their elasticities were measured in the same way as in Example 4. The condition of each of the gels (konnyaku-like, kamaboko-like, deteriorated, etc.) was evaluated. The results are shown in Table 7.

The relation between the gel strenght (W.L) and the heating temperature and time is shown in FIG. 1.

It is seen from the results shown in Table 7 and FIG. 1 that when the heating was carried out for 20 minutes, the setting effect is stronger in the present invention than in the control lot, and the deterioration was markedly inhibited. When the heating was carried out for 120 minutes, gels in the form of a soft lumpy mass in the control lot at a heating temperature of 40° to 70° C. But in the lots of the present invention, slight deterioration was observed at 60° C., but a konnyaku-like gel still remained. Thus, the effect of inhibiting deterioration was observed.

TABLE 7

| Heating time (min.) | Test lot | Elasticity and condition of the gel | Heating temperature (°C.) | | | | | | |
|---|---|---|---|---|---|---|---|---|---|
| | | | 30 | 40 | 50 | 60 | 70 | 80 | 90 |
| 20 | Control | W (g) | 108 | 266 | 210 | 169 | 214 | 337 | 467 |
| | | L (cm) | 1.21 | 1.62 | 1.11 | 0.64 | 0.63 | 0.68 | 0.79 |
| | | W·L (g·cm) | 131 | 431 | 233 | 108 | 135 | 229 | 369 |
| | | Condition of the gel | Paste-like | Konnyaku-like | Deteriorated | Deteriorated | Deteriorated | Kamaboko-like | Kamaboko-like |
| | Invention | W (g) | 123 | 315 | 387 | 589 | 529 | 655 | 657 |

TABLE 7-continued

| Heating time (min.) | Test lot | Elasticity and condition of the gel | Heating temperature (°C.) | | | | | | |
|---|---|---|---|---|---|---|---|---|---|
| | | | 30 | 40 | 50 | 60 | 70 | 80 | 90 |
| 120 | Control | L (cm) | 1.17 | 1.77 | 1.60 | 1.44 | 1.05 | 1.12 | 1.08 |
| | | W · L (g · cm) | 144 | 558 | 619 | 848 | 555 | 734 | 710 |
| | | Condition of the gel | Paste-like | Konnyaku-like | Konnyaku-like | Kamaboko-like | Kamaboko-like | Kamaboko-like | Kamaboko-like |
| | | W (g) | 347 | 155 | 114 | 108 | 240 | 358 | 364 |
| | | L (cm) | 1.51 | 0.94 | 0.75 | 0.69 | 0.62 | 0.60 | 0.69 |
| | | W · L(g · cm) | 524 | 146 | 86 | 75 | 149 | 215 | 251 |
| | | Condition of the gel | Konnyaku-like | Deteriorated | Deteriorated | Deteriorated | Deteriorated | Kamaboko-like | Kamaboko-like |
| | Invention | W (g) | 366 | 429 | 559 | 410 | 513 | 604 | 533 |
| | | L (cm) | 1.68 | 1.56 | 1.27 | 0.88 | 0.90 | 0.92 | 0.91 |
| | | W · L(g · cm) | 615 | 669 | 710 | 361 | 462 | 556 | 485 |
| | | Condition of the gel | Konnyaku-like | Konnyaku-like | Kamaboko-like | Kamaboko-like | Kamaboko-like | Kamaboko-like | Kamaboko-like |

EXAMPLE 6

The same refrigerated minced flesh of Alaska pollack as in Example 3 was defrosted. Six kilograms of the minced flesh was put in a small-sized silent cutter, and together with 3% of salt and 5% of starch, kneaded for 13 minutes. The mixture was then divided into two 3 kg-portions. Powdery sorbitol (1%) was added to one portion, and a pre-mixture of 1% of powdery sorbitol and 0.5% of plasma was added to the other. The two portions were each mixed in a small-sized grinder for 5 minutes, filled in cylindrical casings of polyvinylidene chloride film each having a diameter of 30.6 mm, and heated for 20 minutes or 120 minutes at the various temperatures shown in Table 8 to form gels.

The various gels so obtained were rapidly cooled in ice water for 30 minutes, and immediately then, their elasticities were measured and the conditions of the gels were evaluated as in Example 5. The results are shown in Table 8. The relation between the gel strength (W·L) and the heating temperature and time is shown in FIG. 2.

Figure 2:
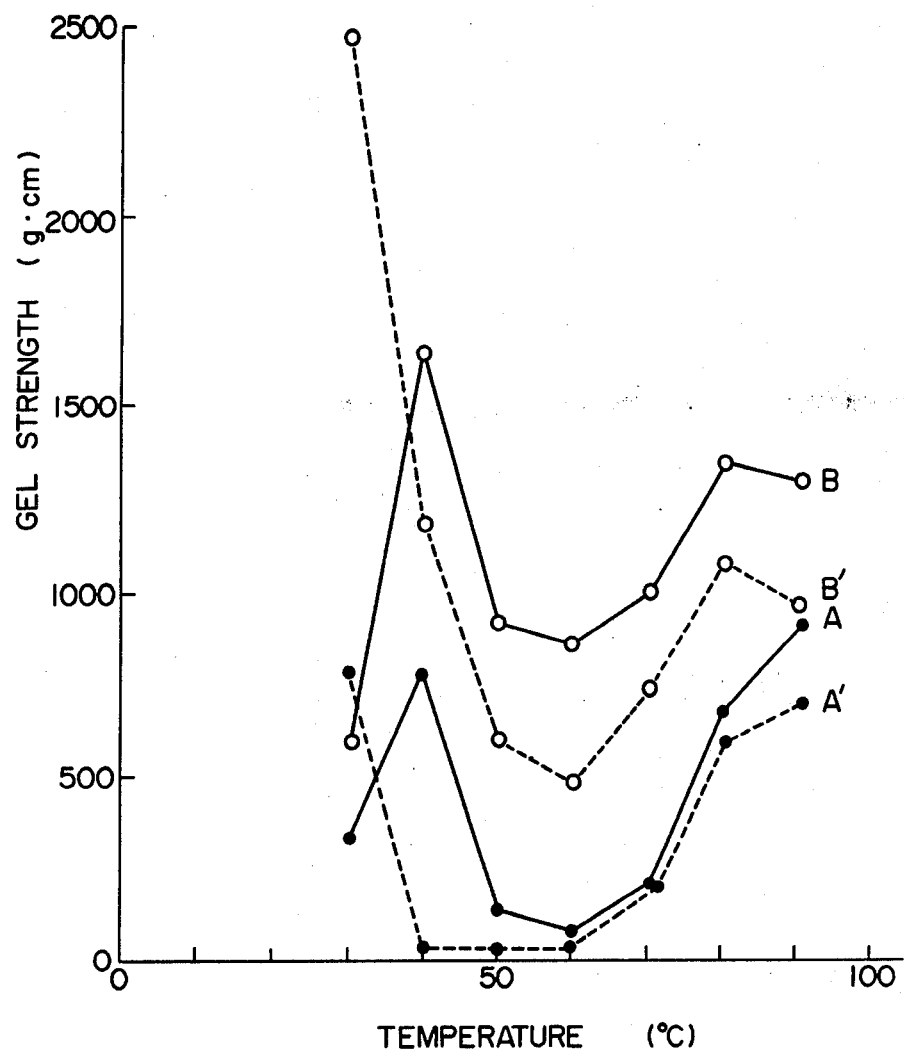
FIG. 2 is a graph showing the relation of the gel strength, the heating temperature and the heating time with respect to a refrigerated minced flesh of Alaska pollack (Example 6).

It is seen from the results given in Table 8 and FIG. 2 that when the heating was carried out for 20 minutes, the effect of setting was greater in the lots of invention than in the control lot, and the deterioration was markedly inhibited. When the heating was carried out for 120 minutes, most of the gels in the control lot were deteriorated at 40° to 70° C. In contrast in the lots of this invention, only slight deterioration was observed at 60° C., and a konnyaku-like gel still remained, thus showing the deterioration inhibiting effect.

TABLE 8

| Heating time (min.) | Test lot | Elasticity and condition of the gel | Heating temperature (°C.) | | | | | | |
|---|---|---|---|---|---|---|---|---|---|
| | | | 30 | 40 | 50 | 60 | 70 | 80 | 90 |
| 20 | Control | W (g) | 164 | 344 | 119 | 94 | 245 | 536 | 619 |
| | | L (cm) | 2.03 | 2.29 | 1.16 | 0.85 | 0.87 | 1.28 | 1.49 |
| | | W · L (g · cm) | 333 | 788 | 138 | 80 | 213 | 686 | 922 |
| | | Condition of the gel | Paste-like | Konnyaku-like | Deteriorated | Deteriorated | Considerably deteriorated | Kamaboko-like | Kamaboko-like |
| | Invention | W (g) | 252 | 596 | 423 | 468 | 606 | 802 | 780 |
| | | L (cm) | 2.40 | 2.75 | 2.17 | 1.84 | 1.65 | 1.69 | 1.67 |
| | | W · L (g · cm) | 605 | 1639 | 918 | 861 | 1000 | 1355 | 1303 |
| | | Condition of the gel | Paste-like | Konnyaku-like | Konnyaku-like | Kamaboko-like | Kamaboko-like | Kamaboko-like | Kamaboko-like |
| 120 | Control | W (g) | 347 | 45 | 51 | 70 | 281 | 534 | 586 |
| | | L (cm) | 2.26 | 0.58 | 0.52 | 0.54 | 0.76 | 1.13 | 1.19 |
| | | W · L (g · cm) | 784 | 26 | 27 | 38 | 214 | 603 | 697 |
| | | Condition of the gel | Konnyaku-like | Deteriorated | Deteriorated | Deteriorated | Considerably deteriorated | Kamaboko-like | Kamaboko-like |
| | Invention | W (g) | 826 | 528 | 408 | 374 | 573 | 744 | 718 |
| | | L (cm) | 2.98 | 2.25 | 1.47 | 1.29 | 1.30 | 1.45 | 1.35 |
| | | W · L (g · cm) | 2461 | 1188 | 600 | 482 | 745 | 1079 | 969 |
| | | Condition of the gel | Konnyaku-like | Konnyaku-like | Kamaboko-like | Kamaboko-like | Kamaboko-like | Kamaboko-like | Kamaboko-like |

What is claimed is:

1. A process for producing a refrigerated minced flesh of fish, which comprises adding (a) sugar and/or a sugar alcohol in an amount of about 2 to about 15% by weight and (b) lactalbumin in an amount of about 0.2 to about 5% by weight and/or blood plasma in an amount of about 0.1 to about 3% by weight to a dewatered fish flesh, mincing the mixture and then refrigerating the minced product.

2. The process of claim 1 wherein ovalbumin is further added in an amount of about 0.2 to about 2% by weight to the dewatered fish flesh.

3. The process of claim 1 wherein a polyphosphate in an amount of 0.1 to 0.3% by weight and/or an edible surface-active agent in an amount of 0.05 to 0.5% by weight is further added to the dewatered fish flesh as auxiliary substances.

4. A process for improving the quality of a fish paste product, which comprises adding blood plasma in an amount of 0.1 to 3% by weight to a meat paste in the production of the fish paste product.

5. The process of claim 4 which comprises preparing the meat paste from white-fleshed fish of reduced freshness or from red-fleshed fish, mincing the fish flesh and grinding the minced flesh with 2 to 3% by weight of salt and adding the blood plasma to the resulting fish meat paste.

6. The process of claim 5 wherein the blood plasma is added as a dry powder pre-mixture with at least one of sugar and sugar alcohol.

7. The process of claim 1 wherein the component (b) comprises lactalbumin.

8. The process of claim 1 wherein component (b) comprises blood plasma.

9. The process of claim 1 wherein component (b) comprises lactalbumin and blood plasma.

* * * * *

Disclaimer 4,464,404.—*Ryuzo Ueno*, Nishinimiya; *Tatsuo Kanayama; Kunihiko Tomiyasu*, both of Takarazuka; *Asao Fujikami; Toshitaka Nakashima*, both of Nishinomiya, all of Japan. PROCESSES FOR PRODUCTION OF REFRIGERATED MINCED FISH FLESH AND FISH PASTE PRODUCT HAVING IMPROVED QUALITY. Patent dated aug. 7, 1984. Disclaimer filed June 14, 1989, by the asignee, Ueno Fine Chemicals Industry, Ltd.

Hereby enters this disclaimer to claims 4, 5 and 6 of said patent.

[ *Official Gazette September 19, 1989* ]